United States Patent
Kim

(10) Patent No.: US 10,877,676 B2
(45) Date of Patent: Dec. 29, 2020

(54) STORAGE DEVICE, CONTROLLER AND METHOD FOR OPERATING STORAGE DEVICE

(71) Applicant: SK hynix Inc., Gyeonggi-do (KR)

(72) Inventor: Jung-Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/537,830

(22) Filed: Aug. 12, 2019

(65) Prior Publication Data
US 2020/0225858 A1    Jul. 16, 2020

(30) Foreign Application Priority Data
Jan. 15, 2019    (KR) .......................... 10-2019-0004970

(51) Int. Cl.
| G06F 12/00 | (2006.01) |
| G06F 3/06 | (2006.01) |
| G06F 12/02 | (2006.01) |
| G06F 11/14 | (2006.01) |

(52) U.S. Cl.
CPC .......... *G06F 3/0632* (2013.01); *G06F 3/0604* (2013.01); *G06F 3/0653* (2013.01); *G06F 3/0659* (2013.01); *G06F 3/0673* (2013.01); *G06F 11/1446* (2013.01); *G06F 12/0246* (2013.01)

(58) Field of Classification Search
CPC .... G06F 3/0632; G06F 3/0604; G06F 3/0653; G06F 3/0659; G06F 3/0673; G06F 12/0246; G06F 11/1446; G06F 11/1471
See application file for complete search history.

(56) References Cited

U.S. PATENT DOCUMENTS 9,092,300 B2 * 7/2015 Wojcik ...................... G06F 8/66

FOREIGN PATENT DOCUMENTS

| KR | 10-2007-0010892 | 1/2007 |
| KR | 10-1375992 | 3/2014 |

\* cited by examiner

*Primary Examiner* — Shawn X Gu
(74) *Attorney, Agent, or Firm* — IP & T Group LLP

(57) ABSTRACT

A storage device includes a semiconductor memory device including memory blocks; and a controller configured to control the semiconductor memory device. The semiconductor memory device stores first firmware in a first memory block among the memory blocks, and stores second firmware in a second memory block among the memory blocks. The controller includes a recovery determination circuit configured to determine whether to perform a recovery operation for at least one of the first and second firmwares, based on loading times of the first and second firmwares, cumulative loading time informations for the first and second firmwares and a booting count information; and a recovery performing circuit configured to perform the recovery operation for at least one of the first and second firmwares, based on the determination of the recovery determination circuit.

17 Claims, 6 Drawing Sheets

STORAGE DEVICE, CONTROLLER AND METHOD FOR OPERATING STORAGE DEVICE

CROSS-REFERENCE TO RELATED APPLICATION

The present application claims priority to Korean Patent Application No. 10-2019-0004970, filed in the Korean Intellectual Property Office on Jan. 15, 2019, which is incorporated herein by reference in its entirety.

BACKGROUND

1. Technical Field

Various embodiments generally relate to a storage device, a controller and a method for operating a storage device.

2. Related Art

A storage device stores data based on a request of a host such as a computer and a smartphone. A storage device may store data in a magnetic disk, such as a hard disk drive (HDD), or store data in a nonvolatile memory, such as a solid state drive (SDD), a universal flash storage (UFS) device or an embedded MMC (eMMC) device.

A storage device may include an SoC (system-on-chip) and firmware (FW) disposed therein, to perform read and write operations for the nonvolatile memory according to a request of the host. The firmware is stored in a memory which is included in the storage device, and the storage device loads the firmware stored in the memory at the time of booting. The stored firmware may be updated by a request of the host or an external device.

SUMMARY

Various embodiments are directed to a storage device and an operating method thereof capable of reducing time and storage space resources used to determine whether to recover firmware upon booting.

In an embodiment, a storage device may include: a semiconductor memory device including a plurality of memory blocks; and a controller configured to control the semiconductor memory device, wherein the semiconductor memory device stores first firmware in a first memory block among the plurality of memory blocks, and stores second firmware in a second memory block among the plurality of memory blocks, and wherein the controller includes a recovery determination circuit configured to determine whether to perform a recovery operation for at least one of the first firmware and the second firmware, based on a loading time of the first firmware, a loading time of the second firmware, a cumulative loading time information for the first firmware, a cumulative loading time information for the second firmware and a booting count information; and a recovery performing circuit configured to perform the recovery operation for at least one of the first firmware and the second firmware, based on the determination of the recovery determination circuit.

In an embodiment, a controller suitable for controlling a semiconductor memory device may include: a recovery determination circuit configured to determine whether to perform a recovery operation for at least one of first firmware and second firmware, based on a loading time of the first firmware, a loading time of the second firmware, a cumulative loading time information for the first firmware, cumulative loading time information for the second firmware and a booting count information; and a recovery performing circuit configured to perform the recovery operation for at least one of the first firmware and the second firmware, based on the determination of the recovery determination circuit.

In an embodiment, a method for operating a storage device including a semiconductor memory device which includes a plurality of memory blocks and a controller which controls the semiconductor memory device may include: loading first firmware stored in a first memory block among the plurality of memory blocks; loading second firmware stored in a second memory block among the plurality of memory blocks; determining whether to perform a recovery operation for at least one of the first firmware and the second firmware, based on a loading time of the first firmware, a loading time of the second firmware, a cumulative loading time information for the first firmware, a cumulative loading time information for the second firmware and a booting count information; and performing the recovery operation for at least one of the first firmware and the second firmware, for which the recovery operation is determined to be performed.

In an embodiment, a storage device may comprise: a memory device configured to store first and second firmware, cumulative loading times of the first and second firmware respectively, and numbers of times that the storage device is booted (booting time numbers) with the respective first and second firmware and a controller configured to i) load the first firmware and load the second firmware based on the loaded first firmware, while the storage device boots, measure current loading times of the respective first and second firmware, iii) recover the first and second firmware based on their respective current and cumulative loading times and booting time numbers and iv) initialize, upon the recovery, the cumulative loading time and the booting time number corresponding to each recovered firmware.

According to the embodiments of the disclosure, a storage device and an operating method thereof capable of reducing time and space resources used to determine whether to recover a firmware upon booting are provided.

DETAILED DESCRIPTION

Figure 1:
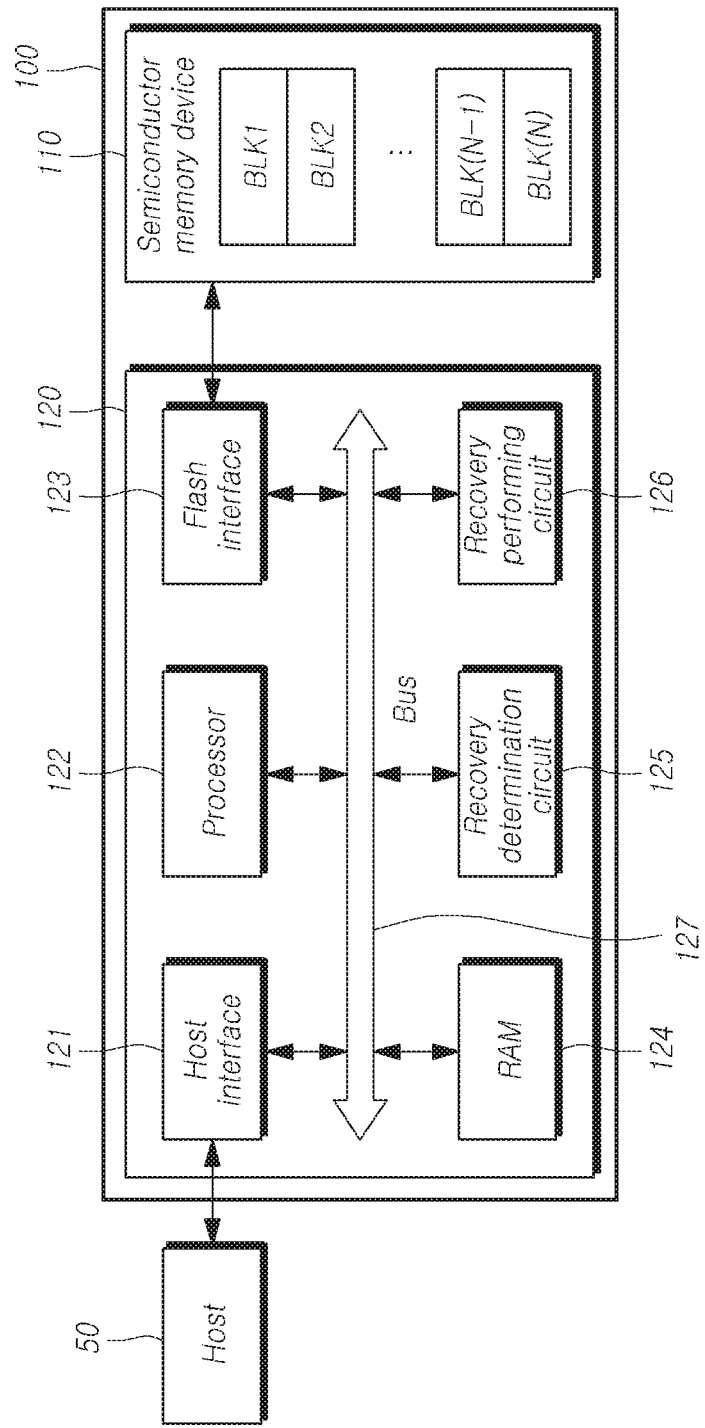
FIG. 1 is a diagram illustrating a configuration of a storage device in accordance with an embodiment of the disclosure.

In the disclosure, advantages, features and methods for achieving them will become more apparent after a reading of the following embodiments taken in conjunction with the accompanying drawings. The invention, however, may be embodied in different forms and thus should not be construed as being limited to the embodiments set forth herein. Rather, these embodiments are provided to describe the disclosure in detail to the extent that a person skilled in the art to which the disclosure pertains can practice the invention.

The invention is not limited to the particulars shown in the drawings, as the drawings are not necessarily to scale and in some instances proportions may have been exaggerated in order to more clearly depict certain features of the disclosure. Like reference numerals denote like elements throughout the drawings and the description.

While particular terminology is used herein, it is to be appreciated that the terminology used herein is for the purpose of describing particular embodiments only and is not intended to limit the scope of the disclosure.

Specific structural and functional description is provided to describe embodiments of the disclosure. However, as noted above, embodiments of the disclosure may be implemented in various forms and thus the invention is not limited to either specific detail or the embodiments described herein. Rather, the present invention encompasses not only the disclosed embodiments but all variations, modifications and equivalents thereof to the extent they fall within the scope of the claims.

As used herein, the term "and/or" includes any and all combinations of one or more of the associated listed items. The terms such as "first" and "second" may be used to identify various components, but those components should not be limited by the terms. The terms are merely used to distinguish one component from other component(s) that have the same or similar names. For example, a first component in one instance may be designated as a second component in another instance, without departing from the scope based on the concept of the disclosure.

A singular expression may include a plural expression depending on context. The articles 'a' and 'an' as used in this application and the appended claims should generally be construed to mean 'one or more' unless specified otherwise or clear from context to be directed to a singular form. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof are present or will be added.

Unless differently defined, all terms used herein, including technical or scientific terms, have the same meanings as the terms generally understood by those skilled in the art to which the disclosure pertains. Ordinary dictionary-defined terms should be interpreted in the context of the related art, and not be interpreted in an ideal or excessively formal way, unless they are clearly so defined in the present specification.

Detailed description of well-known functions and structures incorporated herein may be omitted to avoid obscuring the subject matter of the disclosure. This aims to make the subject matter of the disclosure clearer.

Also, in describing the components of the disclosure, there may be terms used like first, second, A, B, (a), and (b). These are solely for the purpose of differentiating one component from the other but not to imply or suggest the substances, order or sequence of the components. If a component is described as "connected," "coupled" or "linked" to another component, it may mean that the component is not only directly "connected," "coupled" or "linked" but also is indirectly "connected," "coupled" or "linked" via a third component.

Various embodiments are described below with reference to the accompanying drawings, to explain the disclosure in detail to the extent that a person skilled in the art can easily carry out the technical idea of the disclosure. Throughout the specification, reference to "an embodiment" or the like is not necessarily to only one embodiment, and different references to any such phrase are not necessarily to the same embodiment(s).

FIG. 1 is a diagram illustrating a configuration of a storage device in accordance with an embodiment of the disclosure.

Referring to FIG. 1, a storage device 100 may include a semiconductor memory device 110 and a controller 120.

The semiconductor memory device 110 may store data. The semiconductor memory device 110 operates in response to the control of the controller 120. The semiconductor memory device 110 may include a memory cell array including a plurality of memory cells which store data.

In an embodiment, the semiconductor memory device 110 may be a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

In an embodiment, the semiconductor memory device 110 may be realized as a three-dimensional array structure. The disclosure may be applied to not only a flash memory device in which a charge storage layer is configured by a conductive floating gate (FG) but also a charge trap flash (CTF) in which a charge storage layer is configured by a dielectric layer.

The semiconductor memory device 110 is configured to receive a command and an address from the controller 120 and access a region selected by the address in the memory cell array. In other words, the semiconductor memory device 110 may perform an operation corresponding to the command, for a region selected by the address.

For example, the semiconductor memory device 110 may perform a program operation, a read operation and an erase operation. In the program operation, the semiconductor memory device 110 may program data to a region selected by the address. In the read operation, the semiconductor memory device 110 may read data from a region selected by the address. In the erase operation, the semiconductor memory device 110 may erase data stored in a region selected by the address.

The semiconductor memory device 110 may include therein a plurality of, e.g., N, memory blocks (N is a natural number), which may be designated as BLK1, BLK2, . . . , BLK(N), respectively. The semiconductor memory device 110 may store firmware in at least one memory block among the plurality of memory blocks BLK1, BLK2, . . . , BLK(N).

The firmware may be one or more items of firmware, which may be different versions of firmware. Respective items of firmware may be stored in different memory blocks in the semiconductor memory device 110.

For example, among the memory blocks, first firmware may be stored in a first memory block and second firmware may be stored in a second memory block.

The reason why different items of firmware are stored in separate memory blocks is to limit the effect an error in a particular memory block has on the entire set of firmware. That is, when an error occurs in a particular memory block, firmware items in other memory blocks are not affected by the error.

The controller 120 may control the operation of the semiconductor memory device 110 according to a request of a host 50 or in the absence of a request of the host 50. For example, the controller 120 may control write, read, erase and background operations for the semiconductor memory device 110. For example, the background operation may be a garbage collection (GC) operation, a wear leveling (WL) operation, a bad block management (BBM) operation, or the like.

The controller 120 may include a host interface 121, a processor 122, a flash interface 123, a RAM 124, a recovery determination circuit 125, a recovery performing circuit 126 and a bus 127.

The host interface 121 provides an interface for communication with the host 50.

The processor 122 may control general operations of the controller 120, and may perform a logic calculation. The processor 122 may communicate with the host 50 through the host interface 121, and may communicate with the semiconductor memory device 110 through the flash interface 123.

The processor 122 may perform the function of a flash translation layer (FTL). The processor 122 may convert a logical block address (LBA) provided by the host 50 into a physical block address (PBA), through the flash translation layer FTL. The flash translation layer (FTL) may receive the logical block address (LBA) and convert it into the physical block address (PBA), by using a mapping table. There are various address mapping methods of the flash translation layer, depending on a mapping unit. Representative address mapping methods include a page mapping method, a block mapping method and a hybrid mapping method.

The processor 122 is configured to randomize data received from the host 50. For example, the processor 122 may randomize the data received from the host 50, by using a randomizing seed. Randomized data as data to be stored is provided to the semiconductor memory device 110 and is programmed to the memory cell array.

The processor 122 is configured to derandomize data received from the semiconductor memory device 110, in a read operation. For example, the processor 122 may derandomize data received from the semiconductor memory device 110, by using a derandomizing seed. Derandomized data may be outputted to the host 50.

The processor 122 may drive firmware loaded in the RAM 124 upon booting to control general operations of the controller 120 and perform a logic calculation.

The flash interface 123 provides an interface for communication with the semiconductor memory device 110.

The RAM 124 may store firmware, a program code, a command or data which is necessary to drive the controller 120, and may be an SRAM or a DRAM.

An operation in which the firmware stored in the semiconductor memory device 110 are loaded to the RAM 124 upon booting is described below with reference to FIG. 2.

The recovery determination circuit 125 determines whether to perform a recovery operation for at least one of the first firmware and the second firmware, based on a loading time of the first firmware, a loading time of the second firmware, cumulative loading time information for the first firmware, cumulative loading time information for the second firmware and booting count information.

A recovery operation for firmware means an operation of normalizing the firmware in the case where an abnormality occurs during the loading or operation of the firmware, and may be, for example, an operation of storing the firmware in the semiconductor memory device 110 again in a normal state.

Cumulative loading time information for firmware means history information on times taken to load the firmware to the RAM 124, which is done each time the storage device 100 is booted. For example, in the case where the storage device 100 is booted 10 times, the time taken to load the firmware to the RAM 124 at each of the 10 booting times is reflected on the cumulative loading time information for the firmware.

The cumulative loading time information may be in the form of individual load times, one for each boot, or may be in the form of a total sum of the individual load times.

For example, when the storage device 100 had been previously booted three times and the loading times of the firmware at the respective booting times were 1.0 ms, 1.5 ms and 1.2 ms, the cumulative loading time information for the firmware may be a form that separately includes the time values of 1.0 ms, 1.5 ms and 1.2 ms, or may be a form that includes (1.0+1.5+1.2)=3.7 ms as the total sum of the loading times of the firmware.

Why a loading time of each of the first and second firmware, cumulative loading time information for each such item of firmware, and a booting count information are used to determine whether to recover the first firmware and the second firmware is described below.

Whether to recover firmware may be based on the level or amount of stress applied to a memory block in which the firmware is stored. To that end, a method of indirectly estimating the stress applied to such memory block may be carried out using a test memory block of the same condition as the memory block in which the firmware is stored. The same condition means that a write operation is performed in the same manner as in the memory block in which the firmware is stored.

In detail, after data stored in the test memory block is read upon each booting, if an error occurs during a reading process, it is estimated that the same stress applied to the test memory block is also applied to the memory block in which the firmware is stored, and the firmware is recovered depending on the level of the estimated stress.

However, using a test memory block as described above may cause a problem in that data storage space decreases because a memory block which is to be used to store data is instead used as the test memory block. Another problem with the test memory block scheme is that total booting time increases as a result of having to check the state of the test memory block upon booting. In other words, if a test memory block is used, time and storage space resources are wasted upon booting.

Moreover, in the case where firmware are distributed to different memory blocks, recovery may be performed for all the firmware even when it is sufficient to recover only firmware stored in a specific memory block. Recovering firmware in a block where no error occurred is problematic in that it unnecessarily increases the erase/write count in that block.

Therefore, in order to figure out the stress applied to a memory block in which firmware is stored, a method of directly determining the stress state of the memory block in which the firmware is stored, using the loading time of the firmware, may be preferable to an indirect estimation method using a separate test block. This is because the greater the stress state on the memory block, the more likely it is that read disturb will occur. If read disturb occurs, it may take a long time to read the firmware from the memory block.

The recovery performing circuit 126 performs a recovery operation for at least one of the first firmware and the second firmware, for which the recovery determination circuit 125 determines to perform the recovery operation.

Operations of the recovery determination circuit 125 and the recovery performing circuit 126 are described in more detail below with reference to FIG. 3.

The bus 127 may be configured to provide channels among the components of the controller 120.

Figure 2:
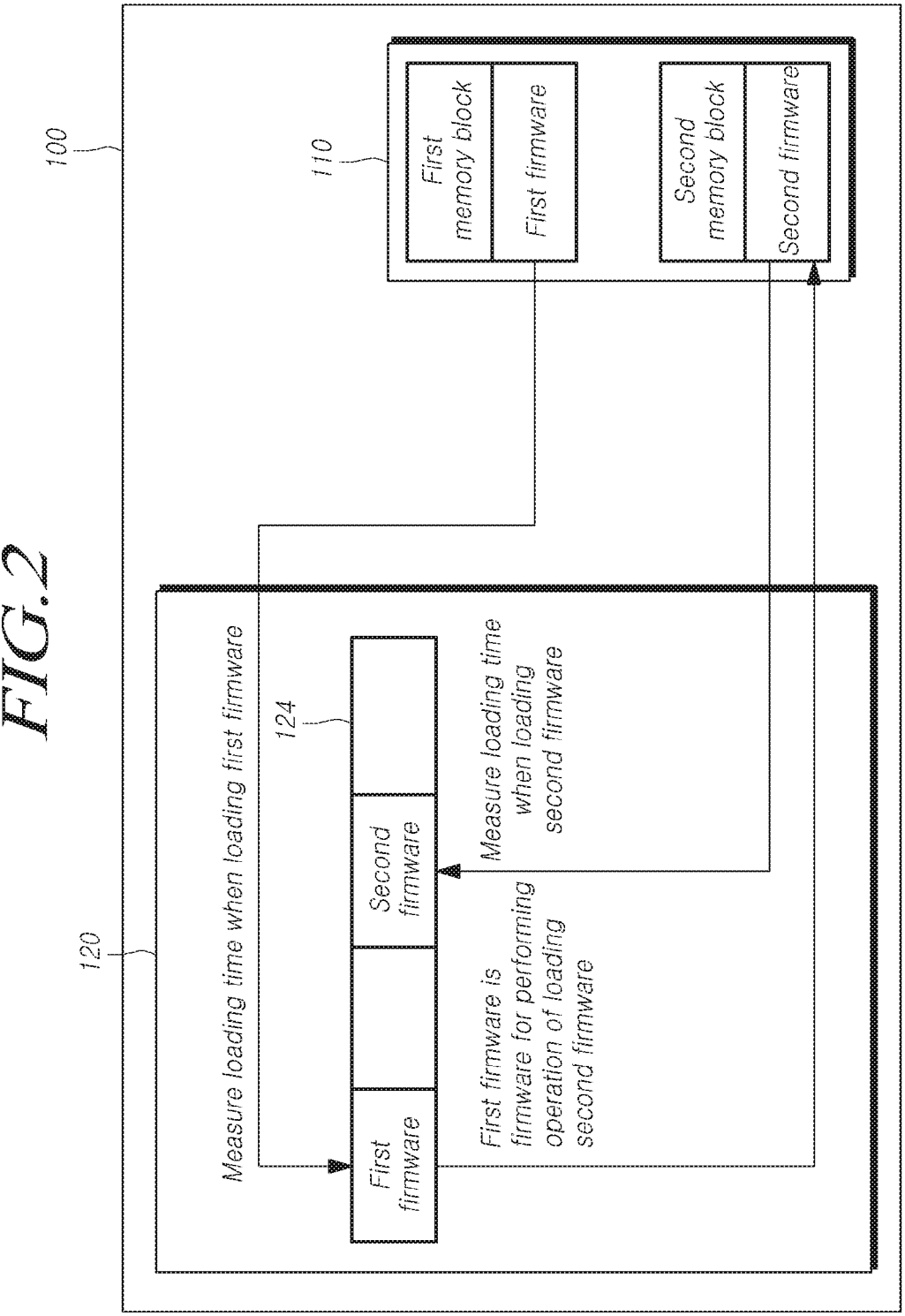
FIG. 2 is a diagram illustrating operations of loading firmware upon booting a storage device, such as that of FIG. 1.

FIG. 2 is a diagram illustrating operations of loading firmware upon booting in the storage device 100 of FIG. 1.

First, as described above with reference to FIG. 1 as an example, among the memory blocks included in the semiconductor memory device 110, first firmware is stored in a first memory block and second firmware is stored in a second memory block.

Upon booting, the first firmware stored in the first memory block is first loaded to the RAM 124. At this time, the loading time of the first firmware, which is to be used to determine whether to recover the first firmware, may be measured.

The loading time of the first firmware may be measured by a module which loads the first firmware to the RAM 124. For instance, the loading time of the first firmware may be measured by a ROM device which initially operates upon booting. The ROM device may calculate the loading time of the first firmware using difference between the tick value at the time when the loading of the first firmware is started and the tick value at the time when the loading of the first firmware is completed.

After the first firmware is loaded to the RAM 124, the second firmware stored in the second memory block is loaded to the RAM 124. The first firmware previously loaded to the RAM 124 may perform the operation of loading the second firmware to the RAM 124. Namely, if the first firmware is loaded to the RAM 124, as the processor 122 drives the first firmware, the second firmware stored in the second memory block is loaded to the RAM 124.

For instance, the first firmware may be bootloader firmware which reads main firmware from the semiconductor memory device 110 upon booting and loads the main firmware to the RAM 124, and the second firmware may be the main firmware which performs the general operations of the controller 120.

Similar to the case of the first firmware, the loading time of the second firmware, which is to be used to determine whether to recover the second firmware, may be measured. For instance, as the first firmware for loading the second firmware is driven, the loading time of the second firmware may be measured.

A system tick or a real time clock (RTC) may be used to measure the loading time of the first firmware and the loading time of the second firmware described above.

The reason why the loading time of the first firmware and the loading time of the second firmware are separately measured in this way is to selectively determine which of the first firmware and the second firmware needs to be recovered to avoid the problem of unnecessarily recovering firmware in a block where no error or other problem has occurred. Universally recovering all firmware distributed among the memory blocks causes unnecessary wear on blocks in which no problem has occurred.

If recovery operations for the first firmware and the second firmware are separately determined by separately measuring the loading time of the first firmware and the loading time of the second firmware, recovery is advantageously directed to only firmware in block(s) in which a problem has occurred; recovery is not performed for the remaining normal firmware in block(s) in which no problem has occurred, thereby not subjecting such block(s) to increased wear.

Moreover, when a timeout occurs upon booting, since it is possible to identify the firmware that caused the timeout as a result of a problem that occurred during the loading of that firmware, an advantage may be provided in that a debugging operation is easy. For instance, in the case where the first firmware is a bootloader which is loaded by a ROM device, it is difficult to check whether an error has occurred in the first firmware. In this regard, based on the loading time of the first firmware, it is possible to check whether an error has occurred in the first firmware. This is because, if an error has occurred during the reading of the first firmware, it takes an additional time to correct the error, thereby increasing the loading time of the first firmware.

Thereafter, the loading time of the first firmware is added to the cumulative loading time information for the first firmware, and the loading time of the second firmware is added to the cumulative loading time information for the second firmware. That is to say, upon each booting, the cumulative loading time information for the first firmware and the second firmware are updated. This is to allow the current loading times of the first firmware and the second firmware to be reflected when the storage device 100 is rebooted subsequently.

The time at which the loading time of the first firmware is added to, or reflected on, the cumulative loading time information for the first firmware and the time at which the loading time of the second firmware is added to, or reflected on, the cumulative loading time information for the second firmware may be before or after whether to perform a recovery operation is determined.

When stored firmware is updated to a new version, since the size of the firmware changes, the loading time of the firmware changes, and in this case, cumulative loading time information for the firmware of a previous version is not valid any more.

Therefore, if an update is performed for the first firmware, the cumulative loading time information for the first firmware may be initialized. Similarly, if an update is performed for the second firmware, the cumulative loading time information for the second firmware may be initialized.

Figure 3:
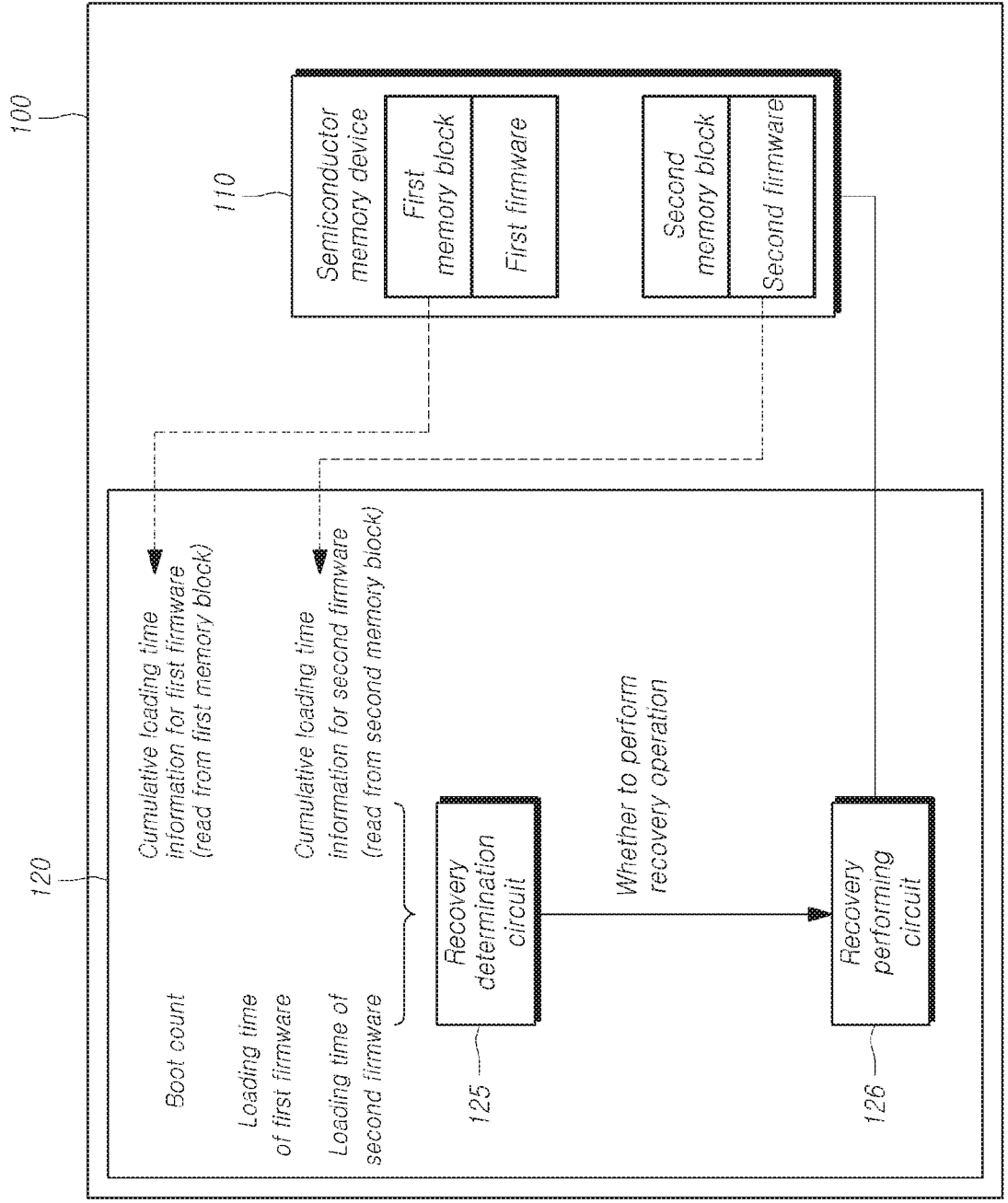
FIG. 3 is a diagram illustrating operations of determining whether to perform a recovery operation and performing recovery in a storage device, such as that of FIG. 1.

FIG. 3 is a diagram illustrating operations of determining whether to perform a recovery operation and performing recovery in the storage device 100 of FIG. 1.

The recovery determination circuit 125 determines whether to perform a recovery operation for at least one of the first firmware and the second firmware, based on the loading time of the first firmware, the loading time of the second firmware, the cumulative loading time information for the first firmware, the cumulative loading time information for the second firmware and the booting count information.

As described above with reference to FIG. 2, the loading time of the first firmware and the loading time of the second firmware are measured in the processes of loading the first firmware and the second firmware to the RAM 124.

The cumulative loading time information for the first firmware and the cumulative loading time information for the second firmware are read from the semiconductor memory device 110. For instance, the cumulative loading time information for the first firmware may be read from the first memory block in the same manner as the first firmware. Also, the cumulative loading time information for the second firmware may be read from the second memory block in the same manner as the second firmware.

Lastly, the booting count information indicating how many times the storage device 100 has been booted previously may also be read from the semiconductor memory device 110.

The reason why, cumulative loading time information for its associated firmware is read from the memory block in which the firmware is stored is because the cumulative loading time information may be lost due to an SPO (sudden power-off) in the case where the cumulative loading time information is stored in a RAM or a register.

In order to determine whether to recover the first firmware, the recovery determination circuit 125 calculates an average loading time for the first firmware, based on the cumulative loading time information for the first firmware and the booting count information.

For instance, if the total sum of loading times for the first firmware is A' and a booting count is C, the average loading time for the first firmware may be calculated as D=A'/C. In this case, the weights of the loading times in the respective booting processes are the same.

For another instance, it is possible to calculate the average loading time for the first firmware, by additionally imposing a weight to the loading time of the first firmware before the recent loading time of the first firmware, in the cumulative loading time information for the first firmware.

This is because the loading time of the first firmware measured upon initial booting is highly likely to have a normal value but, if the read count of the first memory block increases as booting is repeated, the loading time of the first firmware measured thereafter is highly likely to be longer than the normal value. Therefore, by additionally imposing a weight to a previous loading time of the first firmware, it is possible to more clearly determine an abnormality in the loading time of the first firmware upon current booting.

(First case: same weight) In detail, assume that the loading times of the first firmware upon booting the previous three times are 1.0 ms, 1.2 ms and 1.4 ms, respectively. If weights of the loading times at respective booting processes are each 1 (i.e., no weighting), the average loading time for the first firmware is (1.0+1.2+1.4)/3=1.2 ms.

(Second case: different weight) However, when a weight for the first booting process is 1, a weight for the second booting process is 0.8 and a weight for the third booting process is 0.6, the average loading time for the first firmware is (1.0*1+1.2*0.8+1.4*0.6)/(1.0+0.8+0.6)=1.16 ms. (Specific value of the weight for each booting process can be determined experimentally).

If the loading time of the first firmware upon fourth booting is 1.45 ms, since the difference between the loading time of the first firmware and the average loading time for the first firmware is larger in the case of the latter (Second case), the latter is highly likely to be determined to be in a situation where recovery is needed. (Meanwhile, in the specification, unless otherwise specified, the loading time of a firmware generally means the current (most recent) loading time of the firmware).

The recovery determination circuit 125 may determine whether to perform a recovery operation for the first firmware, by comparing the loading time A of the first firmware measured while loading the first firmware upon booting and the above-described average loading time D for the first firmware.

For instance, in the case where the difference between the loading time of the first firmware and the average loading time for the first firmware is greater than or equal to a first threshold value (e.g., 1 ms), the recovery determination circuit 125 may determine to perform a recovery operation for the first firmware. The reason for making this comparison is because an error may occur due to an internal or external factor (e.g., an internal temperature or a supply voltage) in the process of measuring loading time.

Further, in order to determine whether to recover the second firmware, the recovery determination circuit 125 calculates an average loading time for the second firmware, based on the cumulative loading time information for the second firmware and the booting count information.

For instance, if the total sum of loading times for the second firmware is B' and a booting count is C, the average loading time for the second firmware may be calculated as E=B'/C. In this case, the weights of the loading times in the respective booting processes are the same, i.e., 1.

For another instance, in the same manner as for the first firmware, it is possible to calculate the average loading time for the second firmware, by additionally imposing a weight to each of the loading times of the second firmware before the most-recent loading time of the second firmware, in the cumulative loading time information for the second firmware.

The recovery determination circuit 125 may determine whether to perform a recovery operation for the second firmware, by comparing the loading time B of the second firmware measured while loading the second firmware upon booting and the above-described average loading time E for the second firmware.

For instance, in the same manner as for the first firmware, in the case where the difference between the loading time of the second firmware and the average loading time for the second firmware is equal to or larger than a second threshold value, the recovery determination circuit 125 may determine to perform a recovery operation for the second firmware.

The first threshold value and the second threshold value described above may be determined based on values measured through repeated experiments. The first threshold value and the second threshold value may be experimentally determined based on the loading time of firmware that actually failed at the time of the read.

Whether to perform a recovery operation for the first firmware and whether to perform a recovery operation for the second firmware are independently determined. In other words, the recovery determination circuit 125 may determine to perform a recovery operation for only the first firmware or the second firmware, or may determine to perform recovery operations for both of the first firmware and the second firmware.

The recovery performing circuit 126 may perform a recovery operation for at least one of the first firmware and the second firmware, for which the recovery determination circuit 125 determines to perform the recovery operation.

A recovery operation may be performed in such a way as to erase and then reprogram a memory block in which firmware is stored. In a write operation generally performed in a flash memory, a recovery operation is performed in such a way as to newly write data in a separate memory block different from a memory block in which data is stored. However, recovery for firmware adopts a scheme of directly erasing a memory block in which the firmware is stored and then reprogramming the firmware to the same memory block. This is because, in order to load firmware upon booting, the position of a memory block in which the firmware is stored needs to be fixed.

Thus, when performing a recovery operation for the first firmware, the recovery performing circuit 126 may erase the first memory block and then reprogram the first firmware to the first memory block. Similarly, when performing a recovery operation for the second firmware, the recovery performing circuit 126 may erase the second memory block and then reprogram the second firmware to the second memory block.

In this regard, because firmware which is originally stored in a memory block is also erased while erasing the memory block, the backup of the firmware should be stored in a separate region, e.g., a different memory block, for reprogramming.

For example, in the case of reprogramming the first firmware to the first memory block, the first firmware loaded in RAM may be used as the basis for the reprogram operation, but the first firmware which is stored in a backup memory block among memory blocks in the semiconductor memory device 110 may be read and reprogrammed.

Similarly, in the case of reprogramming the second firmware to the second memory block, the second firmware loaded in a RAM may be used as the basis for the reprogram operation, but the second firmware which is stored in a backup memory block among memory blocks in the semiconductor memory device 110 may be read and reprogrammed.

Figure 4:
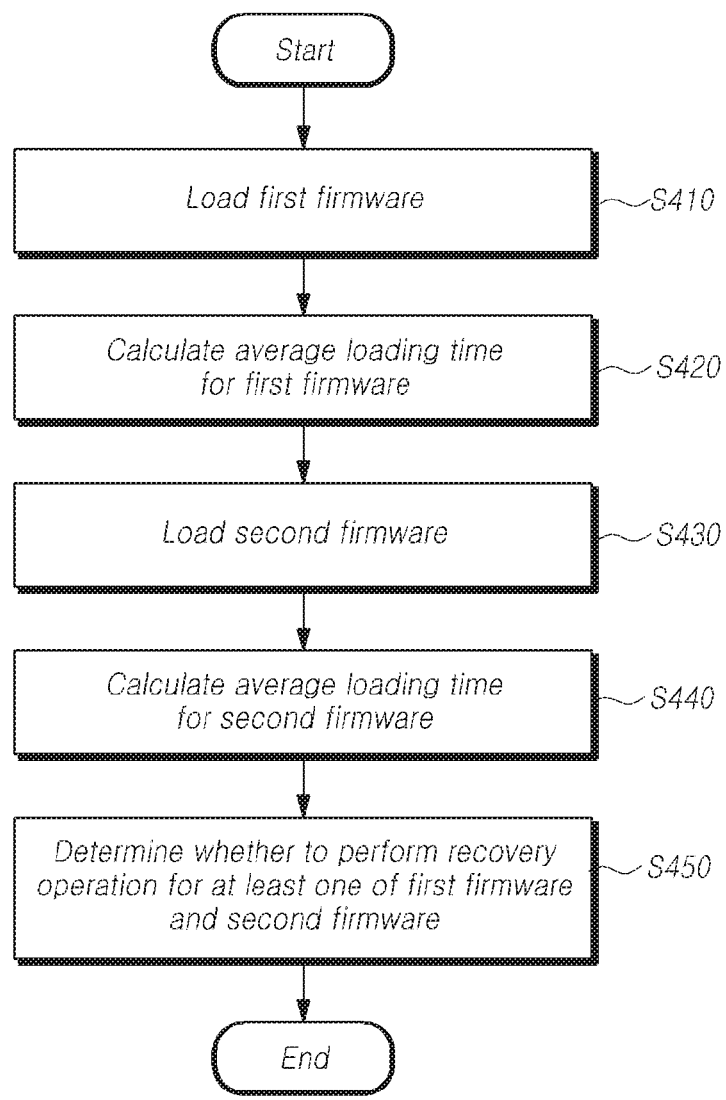
FIG. 4 is a flowchart illustrating a process of loading firmware and determining whether to perform a recovery operation for firmware, in accordance with an embodiment of the disclosure.

FIG. 4 is a flow chart illustrating a process of loading firmware and determining whether to perform a recovery operation for firmware, in accordance with an embodiment of the disclosure. Such process may be performed by the storage device 100 described above.

First, the first firmware stored in the first memory block in the semiconductor memory device 110 is loaded to the RAM 124 (S410). At this time, as described above with reference to FIG. 2, the loading time of the first firmware is measured.

The recovery determination circuit 125 calculates an average loading time for the first firmware, based on booting count information and cumulative loading time information for the first firmware (S420). The cumulative loading time information for the first firmware may be stored in the semiconductor memory device 110, and, for instance, may be read from the first memory block in the same manner as the first firmware.

When the loading of the first firmware is completed, the second firmware stored in the second memory block in the semiconductor memory device 110 is loaded to the RAM 124 (S430). The first firmware loaded at the step S410 is used for performing the operation of loading the second firmware. The processor 122 drives the loaded first firmware such that the second firmware is loaded to the RAM 124.

The recovery determination circuit 125 calculates an average loading time for the second firmware, based on the booting count information and cumulative loading time information for the second firmware (S440). The cumulative loading time information for the second firmware may be read from the second memory block in the same manner as the second firmware.

Thereafter, the recovery determination circuit 125 may determine whether to perform a recovery operation for at least one of the first firmware and the second firmware, by using the loading time of the first firmware measured at the step S410, the average loading time for the first firmware calculated at the step S420, the loading time of the second firmware measured at the step S430 and the average loading time for the second firmware calculated at the step S440 (S450).

Figure 5:
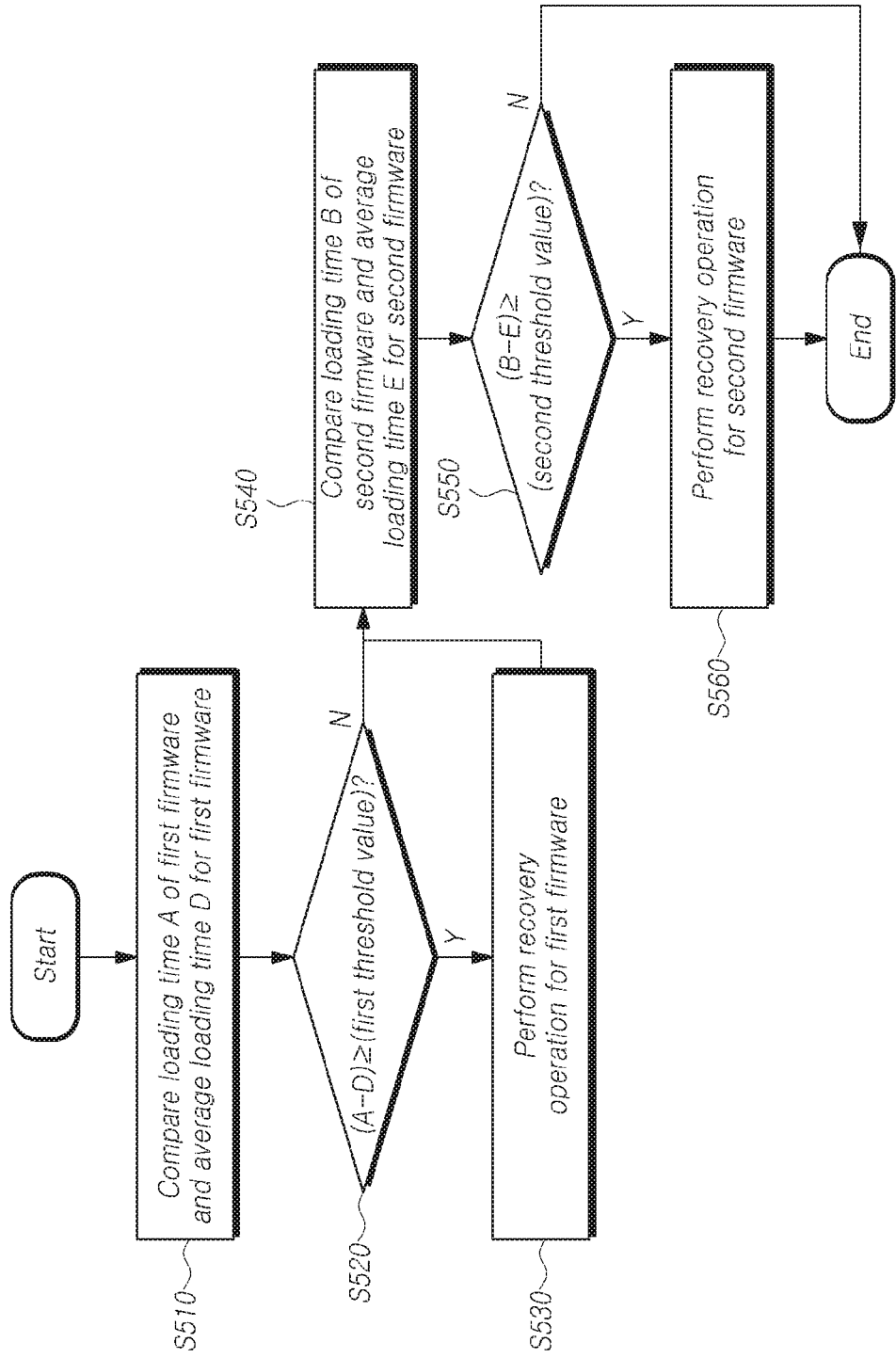
FIG. 5 is a flowchart illustrating a process of determining whether to perform a recovery operation for firmware, in accordance with an embodiment of the disclosure.

FIG. 5 is a flow chart illustrating details of process of determining whether to perform a recovery operation for firmware, in accordance with an embodiment of the disclosure. The process may be performed by the storage device 100 described above.

First, the recovery determination circuit 125 compares the current loading time A of the first firmware and the average loading time D for the first firmware (S510).

In the case where the difference between the loading time A of the first firmware and the average loading time D for the first firmware (that is, A−D) is greater than or equal to the first threshold value ('Y' at step S520), the recovery performing circuit 126 performs a recovery operation for the first firmware (S530). Conversely, in the case where the difference between the loading time A of the first firmware and the average loading time D for the first firmware (that is, A−D) is less than the first threshold value ('N' at step S520), a recovery operation for the first firmware is not performed.

Thereafter, the recovery determination circuit 125 compares the current loading time B of the second firmware and the average loading time E for the second firmware (S540).

In the case where the difference between the loading time B of the second firmware and the average loading time E for the second firmware (that is, B−E) is greater than or equal to the second threshold value ('Y' at step S550), the recovery performing circuit 126 performs a recovery operation for the second firmware (S560). Conversely, in the case where the difference between the loading time B of the second firmware and the average loading time E for the second firmware (that is, B−E) is less than the second threshold value ('N' at S550), a recovery operation for the second firmware is not performed.

As described above with reference to FIG. 3, when performing the recovery operation for the first firmware at the step S530, the recovery performing circuit 126 may erase the first memory block and then reprogram the first firmware to the first memory block. Similarly, when performing the recovery operation for the second firmware at the step S560, the recovery performing circuit 126 may erase the second memory block and then reprogram the second firmware to the second memory block.

Figure 6:
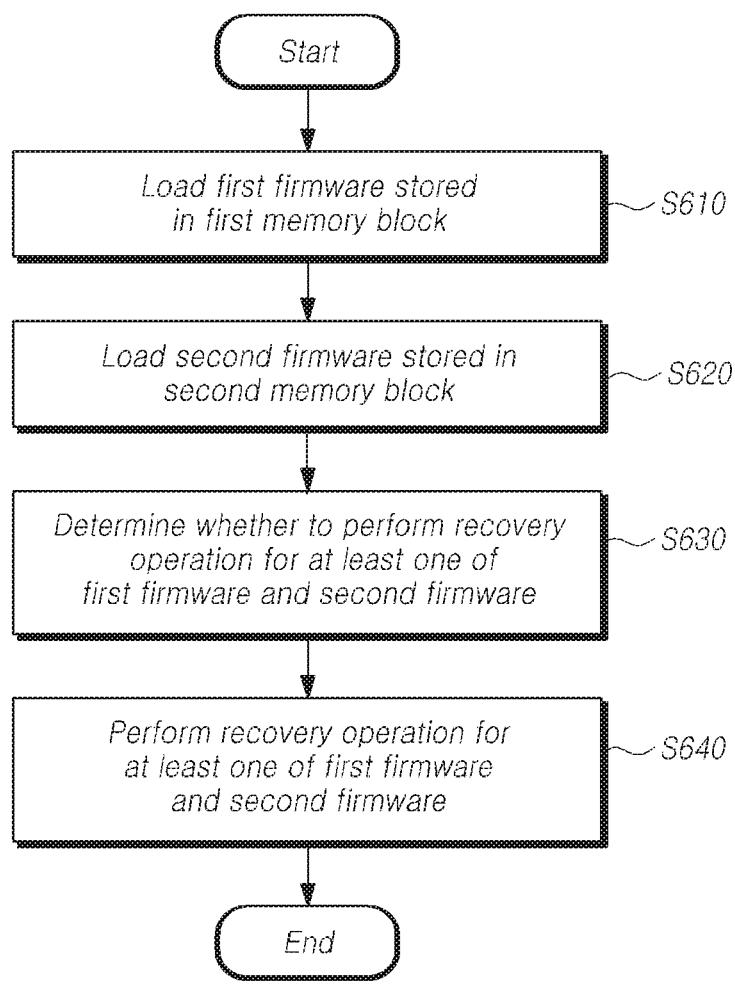
FIG. 6 is a flowchart illustrating a method for operating a storage device in accordance with an embodiment of the disclosure.

FIG. 6 is a flow chart illustrating a method for operating a storage device, e.g., storage device 100 previously described, in accordance with an embodiment of the disclosure.

First, the storage device 100 loads the first firmware stored in the first memory block in the semiconductor memory device 110, to the RAM 124 in the controller 120 (S610). As described above, the loading time of the first firmware is measured in the process in which the first firmware is loaded to the RAM 124.

Then, the storage device 100 loads the second firmware stored in the second memory block in the semiconductor memory device 110, to the RAM 124 in the controller 120 (S620), Also, as described above, the loading time of the second firmware is measured in the process in which the second firmware is loaded to the RAM 124.

As described above, in the case where the first firmware is used for performing the operation of loading the second firmware, the first firmware is loaded before the second firmware.

Thereafter, the recovery determination circuit 125 in the controller 120 of the storage device 100 determines whether to perform a recovery operation for at least one of the first firmware and the second firmware, based on the loading time of the first firmware, the loading time of the second firmware, the cumulative loading time information for the first firmware, the cumulative loading time information for the second firmware and the booting count information (S630).

The recovery performing circuit 126 in the controller 120 of the storage device 100 performs a recovery operation for at least one of the first firmware and the second firmware, for which the recovery determination circuit 125 determined to perform the recovery operation (S640). As described above with reference to FIG. 3, the recovery operation may be performed in such a way as to erase and then reprogram a memory block in which firmware is stored.

In the storage device described above in connection with embodiments of the disclosure, because a test memory block is not used, an advantage may be provided in that, when compared to conventional technology, a storage space that would otherwise be used for the separate test memory block may be saved and the time that would otherwise be taken in the process of reading data stored in the test memory block upon booting may be saved as well.

Further, because recovery may be performed independently for firmware distributed to different memory blocks, it is possible to prevent a problem of the conventional technology in which an erase/write count increases as a result of recovery being performed even for a memory block in which a firmware requiring no recovery is stored.

As a consequence, the storage device described above in embodiments of the disclosure provides advantages in that a booting time may be shortened and firmware may be stably maintained while preventing unnecessary wear on a memory block.

It will be understood by those skilled in the art that technical configurations described above can be modified or embodied in other arrangements without departing from the spirit and essential characteristics of the disclosure. Therefore, it should be understood that the embodiments described above are illustrative and not restrictive. Moreover, the scope of the invention is defined by the appended claims and their equivalents rather than the foregoing description, and all changes or modifications that fall within the scope of the claims and their equivalents are encompassed by the invention.

In the above described embodiments of the disclosure, some steps may be selectively performed or omitted. Moreover, the steps do not necessarily need to be performed in the sequential order as depicted, and they may be performed in a changed order.

Those skilled in the art will understand from the disclosure that various modifications and changes can be made thereto without departing from the broader spirit and scope of the disclosure. Thus, the present invention encompasses not only the disclosed embodiments but all changes and modifications that fall within the scope of the claims and their equivalents.

What is claimed is:

1. A storage device comprising:
a semiconductor memory device including a plurality of memory blocks; and
a controller configured to control the semiconductor memory device,
wherein the semiconductor memory device stores first firmware in a first memory block among the plurality of memory blocks, and stores second firmware in a second memory block among the plurality of memory blocks, and
wherein the controller comprises:
a recovery determination circuit configured to determine whether to perform a recovery operation for at least one of the first firmware and the second firmware, based on a loading time of the first firmware, a loading time of the second firmware, cumulative loading time information for the first firmware, cumulative loading time information for the second firmware, and booting count information; and
a recovery performing circuit configured to perform the recovery operation for at least one of the first firmware and the second firmware, based on the determination of the recovery determination circuit.

2. The storage device according to claim 1,
wherein the first firmware is loaded before the second firmware, and
wherein the first firmware performs an operation of loading the second firmware.

3. The storage device according to claim 1,
wherein the recovery determination circuit calculates an average loading time for the first firmware, based on the cumulative loading time information for the first firmware and the booting count information, and
wherein the recovery determination circuit determines to perform a recovery operation for the first firmware, when a difference between the loading time of the first firmware and the average loading time for the first firmware is greater than or equal to a first threshold value.

4. The storage device according to claim 3, wherein the recovery performing circuit erases the first memory block and then reprograms the first firmware to the first memory block.

5. The storage device according to claim 1,
wherein the recovery determination circuit calculates an average loading time for the second firmware, based on the cumulative loading time information for the second firmware and the booting count information, and
wherein the recovery determination circuit determines to perform a recovery operation for the second firmware, when a difference between the loading time of the second firmware and the average loading time for the second firmware is greater than or equal to a second threshold value.

6. The storage device according to claim 5, wherein the recovery performing circuit erases the second memory block and then reprograms the second firmware to the second memory block.

7. The storage device according to claim 1, wherein the cumulative loading time information for the first firmware is stored in the first memory block.

8. The storage device according to claim 1, wherein the cumulative loading time information for the second firmware is stored in the second memory block.

9. A controller suitable for controlling a semiconductor memory device, the controller comprising:
a recovery determination circuit configured to determine whether to perform a recovery operation for at least one of first firmware and second firmware, based on a loading time of the first firmware, a loading time of the second firmware, cumulative loading time information for the first firmware, cumulative loading time information for the second firmware, and booting count information; and a recovery performing circuit configured to perform the recovery operation for at least one of the first firmware and the second firmware, based on the determination of the recovery determination circuit.

10. A method for operating a storage device including a semiconductor memory device which includes a plurality of memory blocks and a controller which controls the semiconductor memory device, the method comprising:
loading first firmware stored in a first memory block among the plurality of memory blocks;
loading second firmware stored in a second memory block among the plurality of memory blocks;
determining whether to perform a recovery operation for at least one of the first firmware and the second firmware, based on a loading time of the first firmware, a loading time of the second firmware, cumulative loading time information for the first firmware, cumulative loading time information for the second firmware and booting count information; and
performing the recovery operation for at least one of the first firmware and the second firmware, for which the recovery operation is determined to be performed.

11. The method according to claim 10,
wherein the first firmware is loaded before the second firmware, and
wherein the first firmware performs an operation of loading the second firmware.

12. The method according to claim 10, wherein the determining of whether to perform a recovery operation comprises:
calculating an average loading time for the first firmware, based on the cumulative loading time information for the first firmware and the booting count information; and
is determining to perform a recovery operation for the first firmware, when a difference between the loading time of the first firmware and the average loading time for the first firmware is greater than or equal to a first threshold value.

13. The method according to claim 12, wherein the performing of the recovery operation comprises erasing the first memory block and then reprogramming the first firmware to the first memory block.

14. The method according to claim 10, wherein the determining of whether to perform a recovery operation comprises:
calculating an average loading time for the second firmware, based on the cumulative loading time information for the second firmware and the booting count information; and
determining to perform a recovery operation for the second firmware, when a difference between the loading time of the second firmware and the average loading time for the second firmware is greater than or equal to a second threshold value.

15. The method according to claim 14, wherein the performing of the recovery operation comprises erasing the second memory block and then reprogramming the second firmware to the second memory block.

16. The method according to claim 10, wherein the cumulative loading time information for the first firmware is stored in the first memory block.

17. The method according to claim 10, wherein the cumulative loading time information for the second firmware is stored in the second memory block.

* * * * *